United States Patent [19]

Lemelson

[11] Patent Number: 4,532,511
[45] Date of Patent: Jul. 30, 1985

[54] AUTOMATIC VEHICLE IDENTIFICATION SYSTEM AND METHOD

[76] Inventor: Jerome H. Lemelson, 85 Rector St., Metuchen, N.J. 08840

[21] Appl. No.: 298,743

[22] Filed: Sep. 2, 1981

Related U.S. Application Data

[63] Continuation-in-part of Ser. No. 84,429, Oct. 12, 1979, Pat. No. 4,288,689.

[51] Int. Cl.³ .......................... G08G 1/01; G06K 7/00; G08B 13/14
[52] U.S. Cl. .................................... 340/933; 340/572; 340/993; 246/122 R; 246/29 R; 235/435
[58] Field of Search ................ 340/146.3 K, 38 R, 47, 340/23, 572, 989, 993, 941, 933; 235/92 WT, 435; 343/6.5 R, 55; 246/29 R, 122 R; 382/69; 377/9; 455/2; 358/84, 139

[56] References Cited

U.S. PATENT DOCUMENTS

| | | | |
|---|---|---|---|
| 3,054,100 | 9/1962 | Jones | 246/122 R |
| 3,090,042 | 5/1963 | Kleist | 340/941 |
| 3,248,521 | 4/1966 | Freeman | 340/146.3 K |
| 3,377,616 | 4/1968 | Auer, Jr. | 340/146.3 K |
| 3,700,860 | 10/1972 | Reynolds | 340/146.3 K |
| 3,849,633 | 11/1974 | Reitboeck et al. | 340/146.3 K |
| 3,868,669 | 2/1975 | Minasy | 340/572 |
| 3,878,528 | 4/1975 | Majeau | 343/6.5 SS |
| 3,929,277 | 12/1975 | Byrne et al. | 235/92 WT |
| 4,069,472 | 1/1978 | Kamata et al. | 340/146.3 K |
| 4,160,522 | 7/1979 | Dikinis | 340/146.3 K |
| 4,209,783 | 6/1980 | Ohyama et al. | 343/6.5 SS |
| 4,288,689 | 9/1981 | Lemelson et al. | 343/6.5 SS |
| 4,333,072 | 6/1982 | Beigel | 343/6.5 SS |
| 4,356,477 | 10/1982 | Vandebult | 340/572 |
| 4,388,524 | 6/1983 | Walton | 343/6.5 SS |

Primary Examiner—James J. Groody

[57] ABSTRACT

An automatic vehicle identification system for use in identifying and routing vehicles, such as railway cars or other vehicles which routinely travel a given track or path. A passive electronic device or electrical circuit is employed to intersect an energy field and respond thereto by generating a code in accordance with energy received and converted to coded electrical signals. Connected to the passive device is a short wave transmitter for transmitting signals generated by the electrical device when so energized. The electrical device may also comprise a plurality of different induction coils or antenna which serve to modify an energy field in a given manner, which modification may be detected by short wave sensing and converted to a coded electrical signal which is employed to identify the vehicle. In another form, a coded array of antenna or induction coils is provided which modify energy fields generated at check points or scanning locations along a trackway or roadway, wherein such energy field modifications are sensed at each such scanning location, resulting in the generation of an electrical code at each location and identification of the vehicle.

8 Claims, 4 Drawing Figures

AUTOMATIC VEHICLE IDENTIFICATION SYSTEM AND METHOD

RELATED APPLICATIONS

This is a continuation-in-part of Ser. No. 84,429 filed Oct. 12, 1979 now U.S. Pat. No. 4,288,689; issued Sept. 8, 1981.

SUMMARY OF THE INVENTION

This invention relates to an automatic vehicle detection system and method for identifying vehicles, such as railway cars including freight and tank cars or other vehicles. In particular, the invention defines a system and method for generating electrical code signals each time a microminiature electronic circuit or printed circuit antenna supported by a vehicle passes a checkpoint or scanning station located alongside a vehicle guideway or track, such as a rail or track, wherein such systems are employed to operate a switch and/or transmit to a remote location such information derived in detecting variations in the energy field at the scanning location which are caused by the vehicle mounted electrical circuit.

It is known in the art to detect and identify vehicles, such as railway cars, by disposing a plurality of reflective markers on a side wall of such vehicle and scanning same with a photoelectric detection means, such as a light source and photoelectric cell to generate electrical signals in code form which represent the vehicle's identification. Such code signals are recorded and transmitted to a remote location such as a location of a computer which is programmed to control the flow or movement of vehicles into and out of storage. Such systems have been proven to have serious shortcomings resulting from malfunctions in the scanning and code generating operations. The coded reflective strips are subject to deterioration by weather or wear and the scanning devices, which generally comprise one or more photoelectric cells and a light source, are also subject to malfunctioning.

Accordingly it is a primary object of this invention to provide a new and improved apparatus and method for identifying a vehicle.

Another object is to provide an apparatus and method for electronically identifying railway freight cars and other similar railway cars.

Another object is to provide a system, including a plurality of microminiature electrical circuits or circuit devices of a passive nature, and electronic means for detecting code signals generated by the circuit or the presence of the coded antenna supported on the side of the vehicle so as to identify the vehicle.

Another object is to provide a vehicle identification system employing microminiature electronics for generating and short wave transmitting code signals wherein the electrical energy for generating and transmitting such codes is derived from an external source of radiant energy.

Another object is to provide a vehicle identification system employing microminiature electronic code generating circuits for each car or vehicle to be identified which code generating means is tamperproof and not subject to weather deterioration and malfunction.

With the above and such other objects in view as may hereinafter more fully appear, the invention consists of the novel constructions, combinations of parts and the method employed for identifying vehicles and the like, as will be more fully described and illustrated in the accompanying drawings, but it is to be understood that changes, variations and modifications may be resorted to which fall within the scope of the invention as claimed.

Figure 1:
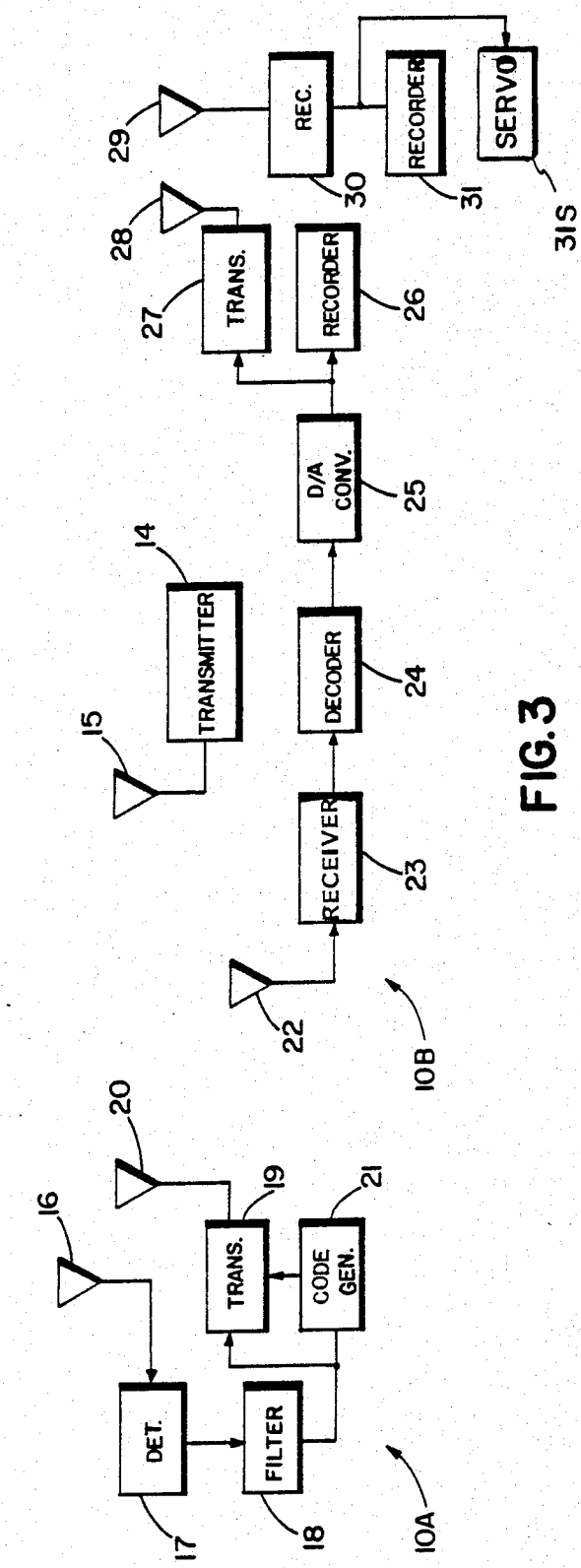
FIG. 1 is an isometric view of a freight car and components of an electronic identification system therefore.

In FIG. 1 is shown a vehicle, such as a freight car 11 traveling along the rails of a track T, preferably in tandem array with a plurality of other freight cars (not shown) of similar or different configurations such as a train of such cars being hauled or pushed by one or more locomotives between destination points of the rail system of which the track T is a part.

A communication system is provided between the freight car 11, and other freight cars employed in the system, and a number of detection and communication devices employed in the system, one of which is illustrated as being supported by a pole 12 or other suitable structure immediately adjacent the track T. Such communication system includes code generating or indicating subsystems, denoted 10A in FIG. 1, supported at the side of each freight car and preferably at about the level of each electronic subsystem 10B supported by each pole or structure 12. The latter subsystem 10B is operable to sense a code or electrical circuit means defining the subsystem 10A supported by the vehicle or car 11, preferably as the car 11 passes the detection station and the electronic sensing device 10B thereof so that only the coded subsystem or code signals of each car is sensed and detected when it is in the immediate vicinity of the sensing means as it passes such sensing means.

Figure 2:
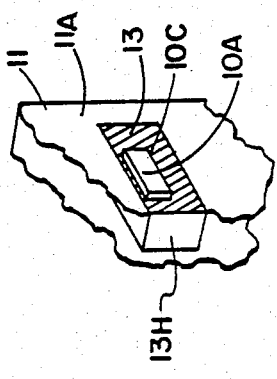
FIG. 2 is an isometric view of a fragment of a wall of a freight car and an electronic package embedded therein.

The electronic subsystem 10A is shown in FIG. 2 as supported within a housing 13H which housing is supported within or against the side wall 11A of the freight car 11. The container for the electronic subsystem 10A is preferably encapsulated or packed within a shock absorbing material 13 which fills the housing 13H and preferably seals the container 10C for the subsystem within the container 13H, to render it both weather and shock proof as well as tamper proof. If supported within the wall 11A of the freight car, the electrical code generating subsystem 10A can be completely sealed therein and hidden from view so as to make it tamperproof except when accessed for maintenance and inspection from the interior of the freight car. The container 10C and its contents may also be permanently sealed in place within the wall 11A or may contain an access cover [not shown] which is openable from either the inside or the outside of the freight car.

Figure 3:
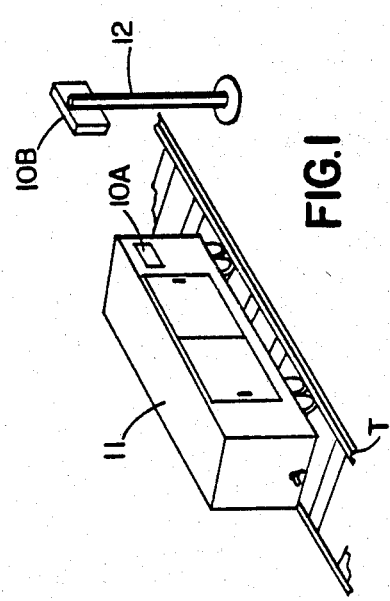
FIG. 3 is a schematic diagram of one form of communication system embodying the instant invention.

In FIG. 3 is shown details of one form of the communication system which includes a short wave transmitter 14, such as a power oscillator, which produces an ultrahigh frequency short wave signal or other type of short wave signal, which is radiated by an antenna 15 and preferably located along or protruding from the housing containing subsystem 10B or the pole mount 12 therefor. Power for the transmitter 14 may be controllably gated on by a sensor or limit switch which detects movement of the freight car 11 past the mount 12. Short wave energy radiated from antenna 15 is received by an antenna 16 forming part of subsystem 10A, when it passes within a certain distance of the radiating subsystem 10B. Such received radiation is converted to an electrical current in electronic circuits which are connected to the antenna 16 and is rectified by a detector 17 and filtered to a steady direct current by a filter 18 and applied thereafter as operational power for energizing and powering a short wave transmitter 19 and a microminiature electronic circuit code generator 21, the output of which is connected to the transmitter 19. When so activated by received energy transmitted by transmitter 14, the code generator 21 generates an electrical code or code signal which it applies to transmitter 19 which short wave broadcasts such code on a broadcast antenna 20 connected to the output of the transmittor 19. As indicated above, the entire system 10A, perhaps with the exception of the antennas 16 and 20, may be completely self contained within a single housing and formed on a single printed circuit or integrated circuit chip disposed in the housing 10C and encapsulated within the material 13.

Short wave code signals which are radiated by antenna 20 are intercepted by a short wave receiving antenna 22 forming part of the subsystem 10B and are converted to electrical signals which are detected by a short wave receiver 23 to which the antenna 22 is connected. Such signals are decoded by a decoder 24, the output of which extends to a digital-to-analog converter 25, the output of which converter is connected to a recorder 26 and/or a short wave transmitter 27 which transmits the code bearing signal, via an antenna 28, to a remote receiving and recording location, such as a central or satellite computer for recording and controlling freight car movement. Such an arrangement is illustrated to the right of FIG. 3 and includes a short wave receiving antenna 29, which is connected to a short wave receiver 30, the output of which extends to a recorder 31, which may be a magnetic recorder or a recording portion of a digital computer employed at such remote location to keep track of all freight cars passing locations such as that illustrated in FIG. 1.

It is also noted that transmitter 27 or an auxiliary circuit connected thereto and operable to be activated each time the convertor 25 or decoder 24 generates an output, may be operable to generate a code specific to the location of the subsystem 10B for identifying such location, either in advance of or after the received short wave signal is transmitted to the remote location at which the receiver 30 is located.

Figure 4:
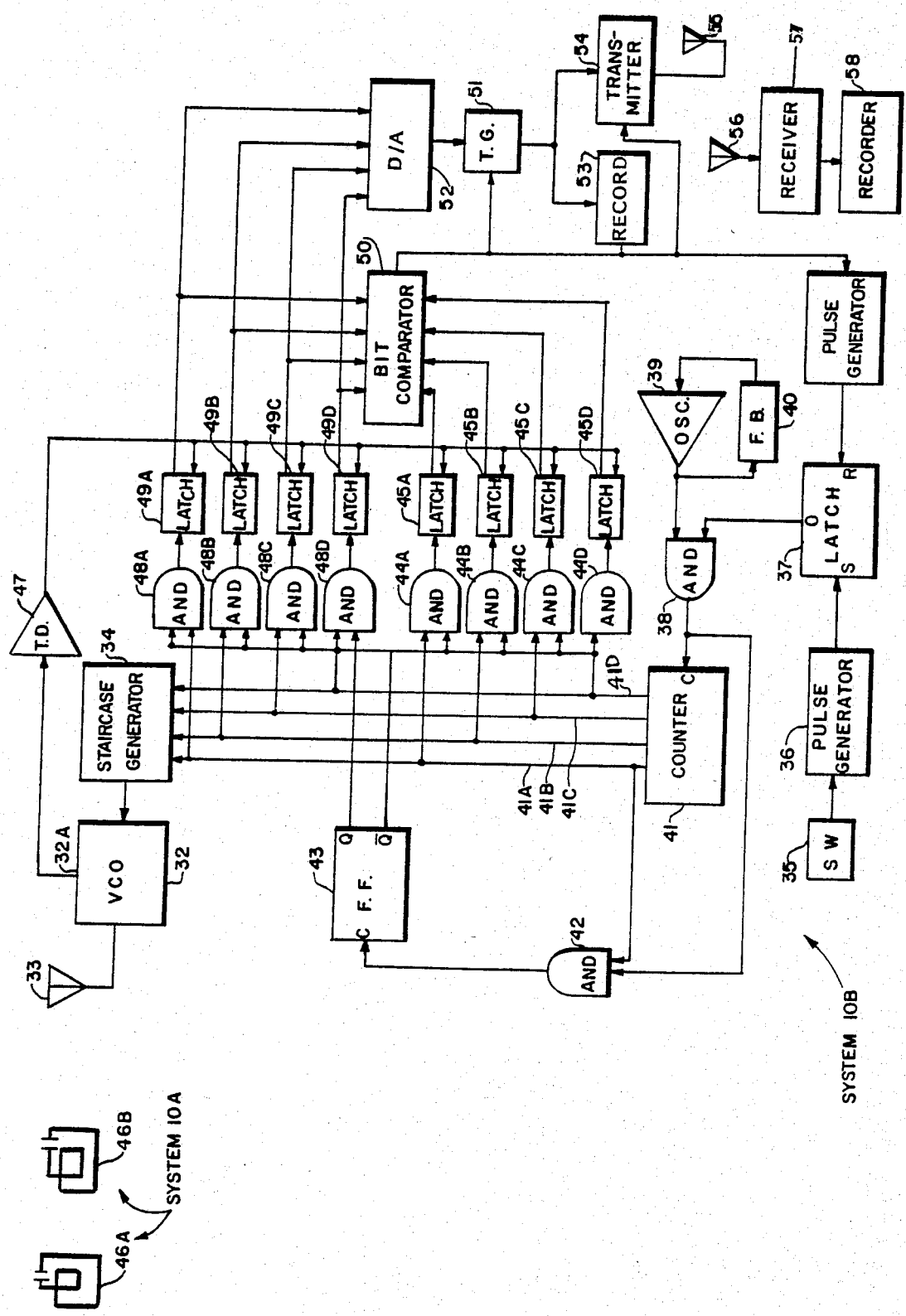
FIG. 4 is a schematic diagram of a modified form of the communication system shown in FIG. 3.

A modified form of the subsystem 10B is illustrated in FIG. 4 which employs electronic circuit means for detecting variations in radiation generated by an oscillator, when a tuned electrical circuit of the same frequency is brought within a given range of such oscillator, due to absorption of some of the radiated energy by such tuned circuit in a manner to create a load on the oscillator which may cause a given change in an electrical parameter of the oscillator, such as source current if the oscillator is composed of a field effect transistor. If such a field effect transistor is employed to form an oscillator, and the oscillator is a so-called VCO oscillator or voltage controlled oscillator, denoted 32 in FIG. 4, it may be designed to produce a number of discrete, stable frequencies each of which is representative of a particular digit or number in a code and is determined by the voltage steps of a staircase generator 34.

When a particular freight car or other vehicle supporting a subsystem 10A causes a normally open detection switch 35, such as a limit switch, photoelectric detector, magnetic or ultrasonic switch to be closed, a pulse generator 36 is caused by the closure of such switch to generate a pulse signal which sets a latch 37, the output of which comprises one input to an AND circuit 38. The other input to AND circuit 38 extends from a clock oscillator 39 having a feedback loop circuit 40. Whenever the output of latch 37 is activated, pulses from oscillator 39 are transferred via AND gate 38 to a decade counter 41, which sequentially activates its plural outputs denoted 41A, 41B, 41C and 41D, in response to the pulses generated by the clock oscillator 39. When coincidence occurs between a clock pulse from oscillator 39 and a true level signal is received from the output of counter 41, an AND gate 42 is activated which controls the clock input of a flip-flop 43, such as a JK flip-flop, causing the $\bar{Q}$ output of such flip-flop to become activated providing a signal input to each of a plurality of AND gates, denoted 44A-44D, allowing such gates to transfer the state of their respective inputs from counter 41 to enable such output signals to set respective of a plurality of latches, denoted 45A-45D.

While the latches 45A-45D are being set, the outputs of counter 41 are sequentially activated and the signals so generated on such outputs are input to the staircase generator 34 and are employed to determine the voltage steps in the output of such staircase generator to determine the particular discrete frequency of the voltage controlled oscillator 32. When an approximately tuned circuit of subsystem 10A, such as a parallel inductor/capacitor circuit 46A and 46B, is within range of the signals radiated by antenna 33, it absorbs some of the radiated energy when the proper frequency thereof is generated, as determined by the precise voltage output of the staircase generator 34. When such tuned circuit is sensed, the parameter of the voltage controlled oscillator 32 changes and is reflected at output 32A and, if such output is of sufficient magnitude, it may be employed to trigger a threshold detector 47, the output of which provides data input to the latches 45A-45D and 49A-49D.

When counter 41 counts through a full cycle and then generates a true output signal on an output 41A thereof, the AND gate 42 is activated, as previously indicated, and transfers a second clock pulse from oscillator 39 to flip-flop 43 toggling such flip-flop switch and thereby deactivating its $\bar{Q}$ output so as to disable the AND gates 44A-44D and to activate the Q output of such flip-flop, which output forms one true input to each of the AND gates 48A-48B inclusive. This action allows the AND gates 48A-48D to transfer the state of their other respective inputs from the output 41A-41D of counter 41, to their respective latches 49A-49D.

The outputs of latches 45A-45D form one set of inputs to a bit comparator 50. The other set of inputs to bit comparator 50 extends from the outputs of latches 49A-49D inclusively. When parity is achieved in the two sets of inputs of the comparator 50, it indicates that precisely the same data has been read in two consecutive cycles of the counter 41 with the possible exception of all zero's. Comparator 50 gives a true output which activates a transmission gate 51, allowing it to transfer the output of digital-to-analog converter 52 to a receiving means 53 which may include a microprocessor recording circuit, tape recorder or other means. The data from the digital-to-analog converter 52 is obtained from information held in latches 49A-49D and is representative of the information which has been read. When the output of bit comparator 50 is true, it also is used to turn on the recorder 53 so that the data may be recorded at the times it is being read.

A short wave transmitter 54 having a suitable radiating antenna 55 is provided for short wave transmitting the coded data generated to a remote location. Transmitter 54 is activated by the true signal it receives from bit comparator 50 and thereafter transmits data presented to it, by means of the transmission gate 51, to a remote location. Such transmission is received by an antenna 56 and converted to electrical signals which are detected by receiver 57 and the signals received may thereafter be recorded by means of a recorder 58.

Where not indicated in the drawings, it is assumed that suitable power supplies are provided on the proper sides of all operating components, preferably from a single source of such power.

Receiving means 53 may also include a computer or microprocessor operable to process the code signals received or generated by sensing as described and utilizing such codes to control one or more local track switches or other devices such as servo motors 31S of FIG. 3 for operating switches or other devices associated with the vehicle or freight car routing, loading or unloading.

I claim:

1. A method of tracking objects comprising:
   generating an energy field at a fixed location in a tracking area, which energy field is composed of a number of discrete and fixed radio frequency signals of different frequencies,
   disposing different coded arrays of passive tuned electrical circuits on a plurality of objects to be tracked which objects may pass said known location, and wherein each of said coded arrays of circuits defines a code which is different from the codes defined by the other objects so that each object has an array of such circuits which is different from the arrays of circuits defining the codes of the other objects, and
   when an object with a coded array of tuned electrical circuits comes within a given range of said fixed location in said tracking area, indicating the presence of said object thereat by detecting the presence of its tuned electrical circuits by sensing the absorption of energy of said field by said passively tuned circuits and generating a corresponding electrical signal for each frequency of the field which experiences energy absorption, and
   generating a code signal defined by the combination of said tuned electrical circuits detected when said object is within said given range of said field and employing said code signal to indicate the presence of said object at said known location.

2. A method in accordance with claim 1 including generating a code signal which is indicative of the location of said energy field in said tracking area when said coded array of circuits comes within a given range of said known location and the energy field thereof.

3. A method in accordance with claim 1 wherein each of said coded arrays of circuits is disposed in a single housing, further including securing said housings at predetermined locations on said objects.

4. A method in accordance with claim 3 including encapsulating said coded arrays of circuits in said housings.

5. A method in accordance with claim 1 wherein said energy field is generated by a voltage controlled oscillator operable to produce a number of discrete stable short wave frequencies defining said energy field.

6. A method in accordance with claim 5 wherein said code signal is generated by means of a staircase generator which is operable to determine the code by generating signals defining the voltage steps in its output resulting from the frequencies of the oscillator which are partly absorbed by said passive tuned electrical circuits.

7. A method in accordance with claim 1 wherein two successive indications of the absorption of energy by each of said tuned electrical circuits is received and said successive indications are compared to determine the parity of the two successive indications.

8. The method in accordance with claim 1 wherein said energy field produces said number of discrete and fixed radio frequency signals in a serial manner and wherein with said code signal defined by the combination of said tuned electrical circuits is in parallel form.

* * * * *